United States Patent [19]

Badesha et al.

[11] Patent Number: 5,587,208

[45] Date of Patent: Dec. 24, 1996

[54] RADIATION INDUCED GRAFTING OF POLYORGANOSILOXANES TO FLUOROELASTOMERS

[75] Inventors: Santokh S. Badesha, Pittsford; David H. Pan, Rochester; William M. Prest, Jr., Webster; Arnold W. Henry, Pittsford; George J. Heeks, Rochester; Louis D. Fratangelo, Fairport, all of N.Y.

[73] Assignee: Xerox Corporation, Stamford, Conn.

[21] Appl. No.: 155,350

[22] Filed: Nov. 22, 1993

[51] Int. Cl.$^6$ ........................................ C08J 7/04
[52] U.S. Cl. .................. 427/503; 428/36.8; 428/421; 428/447; 355/285; 522/99
[58] Field of Search ...................... 427/503, 498, 427/512, 515; 522/99; 525/104; 355/285; 428/36.8, 421, 447

[56] References Cited

U.S. PATENT DOCUMENTS

| | | | |
|---|---|---|---|
| 4,029,827 | 6/1977 | Imperial et al. | 427/22 |
| 4,101,686 | 7/1978 | Strella et al. | 427/22 |
| 4,185,140 | 1/1980 | Strella et al. | 428/418 |
| 4,257,699 | 3/1981 | Lentz | 355/3 |
| 4,264,181 | 4/1981 | Lentz et al. | 355/3 |
| 4,272,179 | 6/1981 | Seanor | 355/3 |
| 4,777,063 | 10/1988 | Dubrow et al. | 427/503 |
| 4,777,087 | 10/1988 | Heeks et al. | 428/321.1 |
| 5,017,432 | 5/1991 | Eddy et al. | 428/422 |
| 5,037,667 | 8/1991 | Dubrow et al. | 427/515 |
| 5,061,965 | 10/1991 | Ferguson et al. | 355/284 |
| 5,141,788 | 8/1992 | Badesha et al. | 428/36.8 |
| 5,166,031 | 11/1992 | Badesha et al. | 430/124 |

*Primary Examiner*—Mark D. Sweet
*Attorney, Agent, or Firm*—Samuel E. Mott; Zosan S. Soong

[57] ABSTRACT

A method of making a low surface energy material such as a fuser member comprising providing a shaped fluoroelastomer, preparing a solvent solution of a polyorganosiloxane having reactive functionality and the formula:

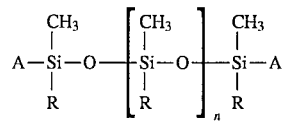

where R is an alkyl, alkenyl or aryl group having less than 19 carbon atoms or an aryl group substituted with an alkyl or alkenyl group having less than 19 carbon atoms, the functional group A is epoxy, vinyl, acrylic, allylic or methacrylic and n is 2 to 350, contacting the fluoroelastomer with the solution to form at least a thin coating of the polyorganosiloxane on said fluoroelastomer and exposing the coated fluoroelastomer to a level of radiation to form a thin surface layer of the polyorganosiloxane grafted to said fluoroelastomer.

15 Claims, 1 Drawing Sheet

RADIATION INDUCED GRAFTING OF POLYORGANOSILOXANES TO FLUOROELASTOMERS

CROSS REFERENCE TO RELATED APPLICATIONS

Attention is directed to application Ser. No. 08/155,351, now U.S. Pat. No. 5,480,938, filed concurrently herewith, entitled "Low Surface Energy Material" in the name of Santokh S. Badesha et al.

BACKGROUND OF THE INVENTION

The present invention relates to a method of making low surface energy materials by grafting polyorganosiloxanes to fluoroelastomers. In a particular application, it relates to a method of fabricating a fuser member in electrostatographic reproducing apparatus which may preferably take the form of a fuser roll, pressure roll or release agent donor roll.

In a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. The visible toner image is then in a loose powdered form and can be easily disturbed or destroyed. The toner image is usually fixed or fused upon a support which may be the photosensitive member itself or other support sheet such as plain paper.

The use of thermal energy for fixing toner images onto a support member is well known. In order to fuse electroscopic toner material onto a support surface permanently by heat, it is necessary to elevate the temperature of the toner material to a point at which the constituents of the toner material coalesce and become tacky. This heating causes the toner to flow to some extent into the fibers or pores of the support member. Thereafter, as the toner material cools, solidification of the toner material causes the toner material to be firmly bonded to the support.

Typically, the thermoplastic resin particles are fused to the substrate by heating to a temperature of between about 90° C. to about 160° C. or higher depending upon the softening range of the particular resin used in the toner. It is undesirable, however, to raise the temperature of the substrate substantially higher than about 200° C. because of the tendency of the substrate to discolor at such at elevated temperatures particularly when the substrate is paper.

Several approaches to thermal fusing of electroscopic toner images have been described in the prior art. These methods include providing the application of heat and pressure substantially concurrently by various means: a roll pair maintained in pressure contact; a belt member in pressure contact with a roll; and the like. Heat may be applied by heating one or both of the rolls, plate members or belt members. The fusing of the toner particles takes place when the proper combination of heat, pressure and contact time are provided. The balancing of these parameters to bring about the fusing of the toner particles is well known in the art, and they can be adjusted to suit particular machines or process conditions.

During operation of a fusing system in which heat is applied to cause thermal fusing of the toner particles onto a support, both the toner image and the support are passed through a nip formed between the roll pair, or plate or belt members. The concurrent transfer of heat and the application of pressure in the nip effects the fusing of the toner image onto the support. It is important in the fusing process that no offset of the toner particles from the support to the fuser member takes place during normal operations. Toner particles offset onto the fuser member may subsequently transfer to other parts of the machine or onto the support in subsequent copying cycles, thus increasing the background or interfering with the material being copied there. The so called "hot offset" occurs when the temperature of the toner is raised to a point where the toner particles liquefy and a splitting of the molten toner takes place during the fusing operation with a portion remaining on the fuser member. The hot offset temperature or degradation of the hot offset temperature is a measure of the release property of the fuser roll, and accordingly it is desired to provide a fusing surface which has a low surface energy to provide the necessary release. To insure and maintain good release properties of the fuser roll, it has become customary to apply release agents to the fuser members to insure that the toner is completely released from the fuser roll during the fusing operation. Typically, these materials are applied as thin films of, for example, silicone oils to prevent toner offset.

Particularly preferred fusing systems take the form of a heated cylindrical fuser roll having a fusing surface which is backed by a cylindrical pressure roll forming a fusing nip there between. A release agent donor roll is also provided to deliver release agent to the fuser roll. While the physical and performance characteristics of each of these rolls, and particularly of their functional surfaces are not precisely the same depending on the various characteristics of the fusing system desired, the same classes of materials are typically used for one or more of the rolls in a fusing system in a electrostatographic printing system.

One of the earliest and most successful fusing systems involved the use of silicone elastomer fusing surfaces, such as a roll with a silicone oil release agent which could be delivered to the fuser roll by a silicone elastomer donor roll. The silicone elastomers and silicone oil release agents used in such systems are described in numerous patents and fairly collectively illustrated in U.S. Pat. No. 4,777,087 to Heeks et al. While highly successful in providing a fusing surface with a very low surface energy to provide excellent release properties to ensure that the toner is completely released from the fuser roll during the fusing operation, these systems suffer from a significant deterioration in physical properties over time in a fusing environment. In particular, the silicone oil release agent tends to penetrate the surface of the silicone elastomer fuser members resulting in swelling of the body of the elastomer causing major mechanical failure including debonding of the elastomer from the substrate, softening and reduced toughness of the elastomer causing it to chunk out and crumble, contaminating the machine and providing non-uniform delivery of release agent. Furthermore, as described in U.S. Pat. No. 4,777,087, additional deterioration of physical properties of silicone elastomers results from the oxidative crosslinking, particularly of a fuser roll at elevated temperatures.

A more recent development in fusing systems involves the use of fluoroelastomers as fuser members which have a surface with a metal containing filler, which interact with polymeric release agents having functional groups, which interact with the metal containing filler in the fluoroelastomer surface. Such fusing systems, fusing members and release agents, are described in U.S. Pat. No. 4,264,181 to Lentz et al., U.S. Pat. No. 4,257,699 to Lentz and U.S. Pat. No. 4,272,179 to Seanor, all commonly assigned to the assignee of the present invention as well as the two above referenced previously filed copending applications. Typically, the fluoroelastomers are (1) copolymers of vinylidenefluoride and hexafluoropropylene, and (2) terpolymers of vinylidene fluoride, hexafluoropropylene and tetrafluoroethylene. Commercially available materials include: Viton E430, Viton GF and other Viton designations as Trademarks of E. I. Dupont deNemours, Inc. as well as the Fluorel materials of 3M Company. The preferred curing system for these materials is a nucleophilic system with a bisphenol crosslinking agent to generate a covalently crosslinked network polymer formed by the application of heat following basic dehydrofluorination of the copolymer. Exemplary of such fuser member is an aluminum base member with a poly(vinylidenefluoride-hexafluoropropylene) copolymer cured with a bisphenol curing agent having lead oxide filler dispersed therein and utilizing a mercapto functional polyorganosiloxane oil as a release agent. In those fusing processes, the polymeric release agents have functional groups (also designated as chemically reactive functional groups) which interact with the metal containing filler dispersed in the elastomer or resinous material of the fuser member surface to form a thermally stable film which releases thermoplastic resin toner and which prevents the thermoplastic resin toner from contacting the elastomer material itself. The metal oxide, metal salt, metal alloy or other suitable metal compound filler dispersed in the elastomer or resin upon the fuser member surface interacts with the functional groups of the polymeric release agent. Preferably, the metal containing filler materials do not cause degradation of or have any adverse effect upon the polymeric release agent having functional groups. Because of this reaction between the elastomer having a metal containing filler and the polymeric release agent having functional groups, excellent release and the production of high quality copies are obtained even at high rates of speed of electrostatographic reproducing machines.

The preferred elastomers are the fluoroelastomers and the most preferred fluoroelastomers are the vinylidenefluoride based fluoroelastomers which contain hexafluoropropylene and tetrafluoroethylene as comonomers. Two of the most preferred fluoroelastomers are (1) a class of copolymers of vinylidenefluoride and hexafluoropropylene known commercially as Viton A and (2) a class of terpolymers of vinylidenefluoride, hexafluoropropylene and tetrafluoroethylene, known commercially as Viton B. Viton A and Viton B and other Viton designations are trademarks of E. I. DuPont deNemours and Company. Other commercially available materials include Fluorel of 3M Company, Viton GH, Viton E60C, Viton B 910, and Viton E 430. The preferred curing system is a nucleophilic system with a bisphenol crosslinking agent to generate a covalently cross linked network polymer formed by the application of heat following basic dehydrofluorination of the copolymer. The nucleophilic curing system also includes an organophosphonium salt accelerator. Some of the commercially available fluoroelastomer polymers which can be cured with the nucleophilic system are Viton E 60C, Viton B 910, Viton E 430, Viton A, Viton B, Viton GF.

The use of polymeric release agents having functional groups which interact with a fuser member to form a thermally stable, renewable self-cleaning layer having superior release properties for electroscopic thermoplastic resin toners is described in U.S. Pat. No. 4,029,827 to Imperial et al., U.S. Pat. No. 4,101,686 to Strella et al. and U.S. Pat. No. 4,185,140 also to Strella et al., all commonly assigned to the assignee of the present invention. In particular, U.S. Pat. No. 4,029,827 is directed to the use of polyorganosiloxanes having mercapto functionality as release agents. U.S. Pat. Nos. 4,101,686 and 4,185,140 are directed to polymeric release agents having functional groups such as carboxy, hydroxy, epoxy, amino, isocyanate, thioether, and mercapto groups as release fluids.

While the mechanism involved in these fusing systems is not completely understood, it has been observed that when certain polymeric fluids having functional groups are applied to the surface of a fusing member having an elastomer surface with a metal oxide, metal salt, metal, metal alloy or other suitable metal compounds dispersed therein, there is an interaction (a chemical reaction, coordination complex, hydrogen bonding or other mechanism) between the metal ion of the filler in the elastomer and the polymeric fluid having functional groups so that the polymeric release agent having functional groups in the form of a liquid or fluid provides an excellent surface for release which having an excellent propensity to remain upon the surface of the fuser member. Regardless of the mechanism there appears to be the formation of a film upon the elastomer surface which differs from the composition of the elastomer and the composition of the polymeric release agent having functional groups. This film, however, has a greater affinity for the elastomer containing a metal compound than the toner and thereby provides an excellent release coating upon the elastomer surface. The release coating has a cohesive force which is less than the adhesive forces between heated toner and the substrate to which it is applied and the cohesive forces of the toner. The interaction between the functional group of the polymeric release agent and the metal ion in the elastomer containing metal leads to an overall diminution of the critical or high surface energy of the metal in the metal containing filler.

While these fluoroelastomers have excellent mechanical and physical properties in that they typically have a long wearing life maintaining toughness and strength over time in a fusing environment, they can only be used with very expensive functional release agents and have to contain expensive interactive metal containing fillers. Typically, for example, the functional release agents are of the order of four times as expensive as their nonfunctional conventional silicone oil release agents.

PRIOR ART

Attempts have been made to combine the advantages of each of these fusing systems.

U.S. Pat. No. 5,141,788 to Badesha et al., describes a fuser member comprising a supporting substrate having an outer layer of a cured fluoroelastomer having a thin surface layer of a polyorganosiloxane having been grafted to the surface of the cured fluoroelastomer in the presence of a dehydrofluorinating agent for the fluoroelastomer and having the active functionality from a hydrogen, hydroxy, alkoxy, amino, epoxy, vinyl acrylic mercapto group.

U.S. Pat. No. 5,166,031 to Badesha et al., is directed to a fuser member comprising a supporting substrate having an outer layer of a volume grafted elastomer which is a substantially uniform integral interpenetrating network of a hybrid composition of a fluoroelastomer and a polyorganosiloxane which is formed by dehydrofluorination of the fluoroelastomer by a nucleophilic dehydrofluorinating agent followed by addition polymerization by the addition of an alkene or alkyne functionally terminated polyorganosiloxane and a polymerization initiator.

SUMMARY OF THE INVENTION

In accordance with a principle aspect of the present invention a method of making a low surface energy material is provided, Further, a thin surface layer of a polyorganosiloxane release layer is grafted on a fluoroelastomer which does not affect the physical properties of the fluoroelastomer.

In a specific aspect of the present invention a fluoroelastomer's surface is contacted with a polyorganosiloxane and exposed to a level of radiation to form a thin surface layer of the polyorganosiloxane grafted to the fluoroelastomer.

In a specific aspect of the present invention a supporting substrate has an outer layer of a fluoroelastomer and a thin surface layer of a polyorganosiloxane radiation induced grafted to the surface of the fluoroelastomer, the polyorganosiloxane having reactive functionality and the formula:

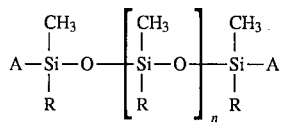

where R is an alkyl, alkenyl or aryl group having less than 19 carbon atoms or an aryl group substituted with an alkyl or alkenyl group having less than 9 carbon atoms, the functional group A is epoxy, vinyl, acrylic, allylic or methacrylic, and n is 2 to 350.

In a further aspect of the present invention the fluoroelastomer is selected from the group consisting of poly(vinylidenefluoride-hexafluoropropylene) and poly(vinylidenefluoride-hexafluoropropylene-tetrafluoroethylene).

In a further aspect of the present invention the thin surface layer is from about 5 to about 100 nanometers thick and is covalently bonded to the cured fluoroelastomer.

In a further aspect of the present invention the substrate is a cylindrical sleeve as a supporting substrate for a pressure roll, fuser roll, or release agent donor member.

In a further aspect of the present invention a shaped fluoroelastomer may be cured or uncured prior to contact with the polyorganosiloxane.

In a further aspect of the present invention the level of radiation to which said coated fluoroelastomer is exposed is sufficient to both dehydrofluorinate or defluorinate said fluoroelastomer and generate free radicals in the functional group A of the polyorganosiloxane which combine to form the surface graft of the polyorganosiloxane bonded to the fluoroelastomer.

In a further aspect of the present invention the shaped fluoroelastomer is placed in a solvent solution of the polyorganosiloxane to swell the fluoroelastomer and enable the polyorganosiloxane to penetrate below the surface of the fluoroelastomer so that on subsequent exposure to radiation a deep graft of the polyorganosiloxane to said fluoroelastomer below the surface of the fluoroelastomer is formed.

DETAILED DESCRIPTION OF THE PRESENT INVENTION

Figure 1:
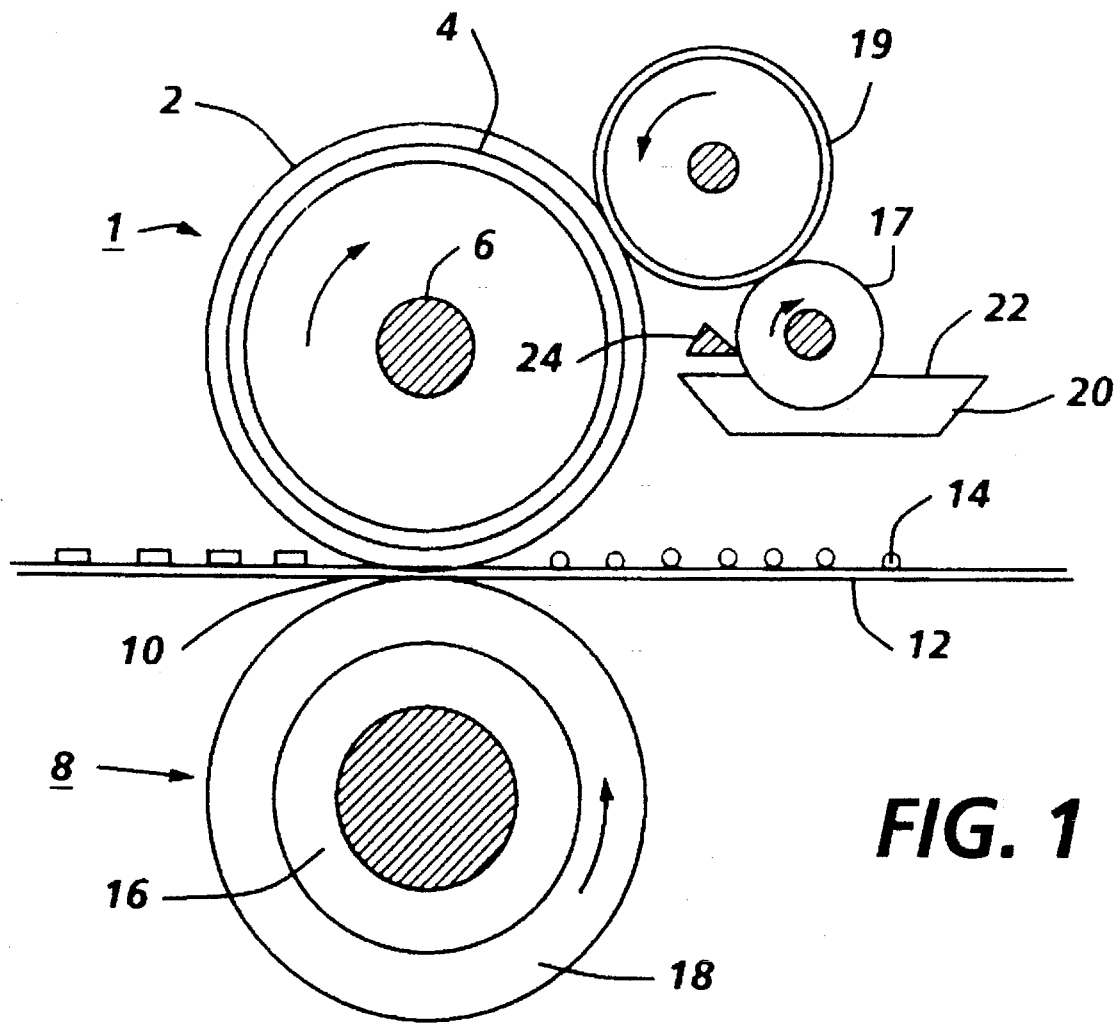
FIG. 1 is a sectional view of a fuser system which may use a fuser member fabricated according to the practice of the present invention.

The low surface energy material described herein while useful in many applications has particular application is a fuser member which may be a roll, belt, flat surface or other suitable shape used in the fixing of thermoplastic toner images to a suitable substrate. It may take the form of a fuser member, a pressure member or a release agent donor member, preferably in the form of a cylindrical roll. Typically, the fuser member is made of a hollow cylindrical metal core, such as copper, aluminum, steel and the like, and has an outer layer of the selected cured fluoroelastomer. Alternatively, there may be one or more intermediate layers between the substrate and the outer layer of the cured elastomer if desired.

The term surface graft is intended to define a thin layer of the polyorganosiloxane which is covalently bonded to the cured outer surface of the fluoroelastomer of the fusing member.

The term covalently bonded is intended to define the chemical bonding between the carbon atom of the fluoroelastomer and the functionality atom of the polyorganosiloxane. These bonds could be C-C, C-O, C-N, C-Si etc., depending upon the functionality.

A typical fuser member is described in conjunction with a fuser assembly as shown in FIG. 1 where the numeral 1 designates a fuser roll comprising elastomer surface 2 upon suitable base member 4 which is a hollow cylinder or core fabricated from any suitable metal such as aluminum, anodized aluminum, steel, nickel, copper, and the like, having a suitable heating element 6 disposed in the hollow portion thereof which is coextensive with the cylinder. Backup or pressure roll 8 cooperates with fuser roll 1 to form a nip or contact arc 10 through which a copy paper or other substrate 12 passes such that toner images 14 thereon contact elastomer surface 2 of fuser roll 1. As shown in FIG. 1, the backup roll 8 has a rigid steel core 16 with an elastomer surface or layer 18 thereon. Sump 20 contains polymeric release agent 22 which may be a solid or liquid at room temperature, but it is a fluid at operating temperatures.

In the embodiment shown in FIG. 1 for applying the polymeric release agent 22 to elastomer surface 2, two release agent delivery rolls 17 and 19 rotatably mounted in the direction indicated are provided to transport release agent 22 from the sump 20 to the elastomer surface. As illustrated in FIG. 1, roll 17 is partly immersed in the sump 20 and transports on its surface release agent from the sump to the delivery roll 19. By using a metering blade 24 a layer of polymeric release fluid can be applied initially to delivery roll 19 and subsequently to elastomer 2 in controlled thickness ranging from submicrometer thickness to thickness of several micrometers of release fluid. Thus, by metering device 24, about 0.1 to 2 micrometers or greater thicknesses of release fluid can be applied to the surface of elastomer 2.

The fluoroelastomers useful in the practice of the present invention are those described in detail in the above referenced U.S. Pat. No. 4,257,699 to Lentz, as well as those described in commonly assigned U.S. Pat. No. 5,061,965 and U.S. Pat. No. 5,017,432. As described therein these fluoroelastomers, particularly from the class of copolymers and terpolymers of vinylidenefluoride hexafluoropropylene and tetrafluoroethylene, are known commercially under various designations as Viton A, Viton E, Viton E60C, Viton E430, Viton 910, Viton GH and Viton GF. The Viton designation is a Trademark of E. I. Dupont deNemours, Inc. Other commercially available materials include Fluorel 2170, Fluorel 2174, Fluorel 2176, Fluorel 2177 and Fluorel LVS 76, Fluorel being a Trademark of 3M Company. Additional commercially available materials include Aflas, a poly(propylene-tetrafluoroethylene), Fluorel II (LII900), a poly(propylene-tetrafluoroethylene-vinylidenefluoride) both also available from 3M Company as well as the Tecnoflons identified as FOR-60KIR, FOR-LHF, NM, FOR-THF, FOR-TFS, TH, TN505 available from Montedison Specialty Chemical Co. Typically, these fluoroelastomers are cured with a nucleophilic addition curing system, such as a bisphenol crosslinking agent with an organophosphonium salt accelerator as described in further detail in the above referenced Lentz Patent, and in U.S. Pat. No. 5,061,965.

The coating of the substrate with the fluoroelastomer is most conveniently carried out by spraying, dipping, or the like, a solution or homogeneous dispersion of the elastomer. While molding, extruding and wrapping techniques are alternative means which may be used, we prefer to spray successive applications of a solvent solution of the polymer onto the surface to be coated. Typical solvents that may be used for this purpose include: methyl ethyl ketone, methyl isobutyl ketone and the like.

Other adjuvants and fillers may be incorporated in the elastomer in accordance with the present invention as long as they do not affect the integrity of the fluoroelastomer. Such adjuvants and fillers normally encountered in the compounding of elastomers include coloring agents, reinforcing fillers, crosslinking agents, processing aids, accelerators and polymerization initiators. Following coating of the fluoroelastomer on the substrate, if a cured fluoroelastomer is desired it may be subjected to a step curing process at about 38° C. for 2 hours followed by 4 hours at 77° C. and 2 hours at 177° C. and 16 hours at 208° C.

The thin surface layer of the polyorganosiloxane, which is grafted on to the fluoroelastomer is derived from a polyorganosiloxane, having reactive functionality of the formula:

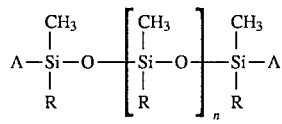

where R is an alkyl, alkenyl or aryl group having less than 19 carbon atoms or an aryl group substituted with an alkyl or alkenyl group having less than 19 carbon atoms, the functional group A is epoxy, vinyl, acrylic, allylic or methacrylic and n is 2 to 350. In the above formula, typical R groups include methyl, ethyl, propyl, octyl, vinyl, allylic crotnyl, phenyl, naphthyl and phenanthryl and typical substituted aryl groups are substituted in the ortho, meta and para portions with lower alkyl groups having less than 15 carbon atoms. Furthermore, in a preferred embodiment n is between 60 and 80 to provide a sufficient number of reactive groups to graft onto the fluoroelastomer.

The coating of the fluoroelastomer by the polyorganosiloxane is typically carried out by spraying, dipping or the like a solution of the polyorganosiloxane to the surface of the cured or uncured fluoroelastomer. Typical solvents that may be used for this purpose include methyl ethyl ketone, methyl isobutyl ketone as well as both aliphatic and cyclic hydrocarbon solvents such as hexane pentane, heptane, cyclohexane, cyclopentane etc. and the like.

Typically, a thin film or coating of the polyorganosiloxane is formed on the surface of the fluoroelastomer to a thickness of from about 1 micron to about 50 microns. At the end of the coating process if a cured fluoroelastomer is desired it may be subjected to the step curing process previously discussed, namely 2 hours at 38° C. followed by 4 hours at 77° C., 2 hours at 177° C. and 16 hours at 208° C.

In one embodiment of the present invention a deep grafting of the polyorganosiloxane on to the fluoroelastomer is formed by placing the shaped fluoroelastomer in a solvent solution of a polyorganosiloxane to swell the fluoroelastomer and thereby enable the polyorganosiloxane to penetrate below the surface of the fluoroelastomer so that upon subsequent exposure to radiation a deep graft of the polyorganosiloxane to the fluoroelastomer below the surface of the fluoroelastomer is formed. This has the advantage of enabling the polyorganosiloxane to penetrate below the surface of the fluoroelastomer to a depth of from about 10 microns to 50 microns and go deeper into the fluoroelastomer there forming a deeper graft of the polyorganosiloxane to the fluoroelastomer providing the advantage that upon subsequent use or wearing away of a fresh surface also carrying the grafted polyorganosiloxane on the fluoroelastomer becomes exposed.

The shaped fluoroelastomer, coated with the polyorganosiloxane is next subjected to radiation for a time and intensity sufficient to dehydrofluorinate or defluorinate the fluoroelastomer creating double bond or free radicals on the surface of the fluoroelastomer by removal of hydrofluoric acid and also generating free radicals on the functional group A of the polyorganosiloxane which combine to form the surface graft of the polyorganosiloxane covalently bonded to the fluoroelastomer. It is believed that this radiation induced grafting of the polyorganosiloxane onto the surface of the fluoroelastomer may be represented by the following equation:

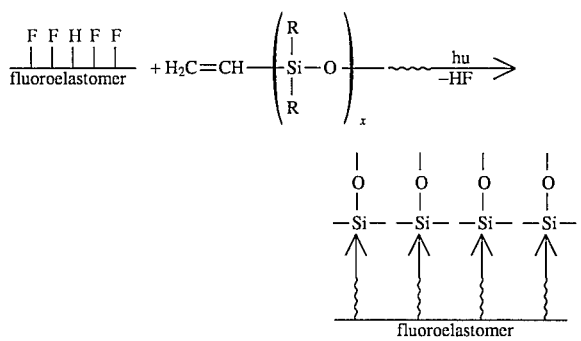

Following irradiation the shaped article may be worked with solvent to remove any unreactant from the fluoroelastomer surface and dried to remove solvent. The necessary radiation may be supplied by any suitable source such as electron beam, X-Rays, gamma rays, UV, corona etc.

The activating radiation employed should be of the high energy type to readily penetrate the entire bulk or mass of adsorbed polymer and fluoroelastomer such that the dehydrofluorination occurs and addition reaction takes place to make a chemical bond between the fluoroelastomer and polysiloxane polymer. Generally, we have found that at least 1 to about 50 Megarads, and preferably about 5 to about 20 Megarads, may be used. This provides a fuser member having a polyorganosiloxane chemically attached to its outer layer providing an excellent releasing surface where the surface graft is a part of the outer surface chemically bonded thereto rather than physically mixed. Further, since the surface graft is very thin the fuser member has the advantage of the high physical stability of the cured fluoroelastomer outer layer. In addition, the polyorganosiloxane surface graft provides a compatible surface for the release agent thereby affecting better release and because of its lower surface energy provides a non-contaminating surface from toner particles. Finally, with the polyorganosiloxane surface graft release agent anchoring sites of metal containing filler, typically metal oxide, are not required and the fusing system does not require the use of functional release agent to interact with the metal containing filler.

The following example further defines and describes a fuser member prepared according to the present invention and illustrates a preferred embodiment of the present invention. Unless otherwise indicated, all parts and percentages are by weight.

EXAMPLE

A pressure roll is made from a standard steel core about 1½ in. in diameter which is primed with an epoxy adhesive, Thixon 300/301. The following formulation was mixed in the listed order and compression molded on the core to the specified dimensions.

| | |
|---|---|
| Viton E 45 (DuPont) | 100 g |
| Carbon Black N991 (Vanderbilt) | 10 |
| Ca (OH)$_2$ | 4 g |
| MAG D (CP Hall) | 2 g |
| C-20 (DuPont) | 1.4 g |
| C-30 (DuPont) | 2.8 g |

The molded roll is subjected to cure and post cure conditions of 2 hours at 200° F., two hours at 300° F., two hours at 350° F., two hours at 400° F., sixteen hours at 450° F. The Viton fluoroelastomer coating is ground to a 3 inch diameter specification and cleaned of mold release. A solution of 250 grams of 100 centistoke vinyl terminated polydimethylsiloxane (PS 441 available from Huls America Inc.) was prepared in a liter solvent mixture of toluene and methyl ethyl ketone in a 9:1 ratio using a two liter Edenmeyer flask. The solution was then poured into an open stainless steel tray and the pressure roll was then placed in the tray in such a way that only surface comes in contact with the solution. The surface of the roll was treated by rolling it in a back and forth motion in the tray for 15 minutes. The roll was then installed in a radiation source at Medpack Co., Woburn, Mass. The radiation grafting was achieved by treating the roll for 4 seconds at a radiation dose of 3 to 5 Megarads. The voltage and current was maintained at 190 KV and 1.0 MA, respectively. To ensure homogeneous irradiation of the surface, the roll was rotated during the radiation process. The roll was then taken out of the radiation fixture and air dried for 1 hour after which time it was put in an oven and heated at 80 degrees centigrade for 30 minutes. The temperature of the oven was then raised to 200 degrees centigrade over a period of 1 hour. This temperature was maintained for 20 minutes after which time the roll was taken out and allowed to cool to room temperature. On cooling the roll was washed with n-hexane and air dried for 3 hours.

X-ray Photoelectron Spectrocopy Characterization of the Grafted Surface

1. Preparation of Surface

The grafted surface was sequentially extracted with solvent, hexane or 90/10 hexane/methyl ethyl ketone mixed solvent, 3 to 4 times. The unreactant or loosely bound siloxane is soluble in these solvents and can be removed from the surface, while the grafted siloxane remains in and on the surface layer.

2. XPS Characterization

The extracted surfaces were then examined with X-ray photoelectron spectroscopy which provided the chemical composition of the topmost 5 to 100 nanometers of the surface layer. The data indicate that the surface of the sample treated with the grafting solution was composed primarily of siloxane.

Testing of the Surface Grafted Pressure Roll

The surface grafted pressure roll was tested in a stressed customer simulation environment. The objective of the test was two-fold, the foremost was to verify the release characteristics of the roll surface. The second objective was to understand the level of toner and paper debris contamination on the roll surface over time. The test conditions stressed both conditions by applying high toner mass in a localized area and running 14" lightweight paper.

After 250,000 prints, there was no evidence of performance degradation with respect to release and no evidence of surface contamination. The test was deemed significant and the surface considered functionally acceptable for the Xerox 5090F product line. The test was suspended without failure.

Thus, according to the present invention, a long life fuser member has been provided which is capable of use as a fuser roll, donor roll or pressure roll, in a fusing system which does not require the use of functional release agent or the presence of a metal containing filler in the transport surface of the fuser member to interact with the functional release agent to form a release layer. This enables an economical fusing system combining the advantages of fluoroelastomer fuser member surfaces and nonfunctional conventional silicone release agent. In addition, the layer of the polyorganosiloxane is sufficiently thin that it does not interfere with the physical properties of the supporting fluoroelastomer layer.

While the above example used a functional release agent it should be noted that the fuser member did not contain any metal containing fillers to serve as anchoring sites for the functional release agent and that acceptable performance was achieved with a roll which was primarily made of a fluoroelastomer. The absence of the metal containing filler enables a more physically stable fuser member and one which is less expensive and easier to manufacture.

Further, the present invention provides an alternative method in grafting a polyorganosiloxane to a fluoroelastomer and one that is a simple step process, one which does not consume a lot of time and one which is relatively inexpensive once the radiation source is available. Furthermore, it enables a deeper graft in the fluoroelastomer thereby providing a continued polysiloxane grafted onto the fluoroelastomer with any subsequent wearing of the surface. In addition, testing of the pressure roll in a Xerox 5090 while the test was suspended after 50,000 prints for other reasons revealed no failure of the pressure roll showing no offset toner, no contamination with paper fibers, no decomposition or debonding, or any other deleterious effect on the organopolysiloxane grafted surface.

All the patents and applications referred to herein are hereby specifically, and totally incorporated herein by reference in their entirety in the instant specification.

While the invention has been described in detail with reference to specific and preferred embodiments, it will be appreciated that various modifications and variations will be apparent to the artisan. All such modifications and embodiments as may readily occur to one skilled in the art are intended to be within the scope of the appended claims.

We claim:

1. The method of making a low surface energy material comprising providing a shaped fluoroelastomer, preparing a solvent solution of a polyorganosiloxane having reactive functionality and the formula:

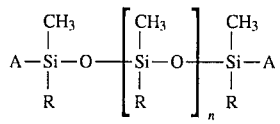

where R is an alkyl, alkenyl or aryl group having less than 19 carbon atoms or an aryl group substituted with an alkyl or alkenyl group having less than 19 carbon atoms, the functional group A is epoxy, vinyl, acrylic, allylic or methacrylic and n is 2 to 350, contacting said fluoroelastomer with said solution to form at least a thin coating of the polyorganosiloxane on said fluoroelastomer, and generating free radicals in the fluoroelastomer and in the polyorganosiloxane by exposing said coated fluoroelastomer to a level of activating radiation wherein the fluoroelastomer and the polyorganoxiloxane couple together to form a thin surface layer of the polyorganosiloxane grafted to said fluoroelastomer, wherein said shaped fluoroelastomer is placed in said solvent solution of said polyorganosiloxane to swell said fluoroelastomer and enable said polyorganosiloxane to penetrate below the surface of said fluoroelastomer so that upon subsequent exposure to said radiation a deep graft of said polyorganosiloxane to said fluoroelastomer below the surface of said fluoroelastomer is formed.

2. The method of claim 1, wherein said shaped fluoroelastomer is cured.

3. The method of claim 1, wherein said shaped fluoroelastomer is uncured.

4. The method of claim 1, wherein the level of radiation to which said coated fluoroelastomer is exposed is sufficient to defluorinate said fluoroelastomer, thereby generating the free radicals in the fluoroelastomer, and to generate free radicals in the functional group A of the polyorganosiloxane.

5. The method of claim 1, wherein the treated fluoroelastomer is subsequently removed from the solution; washed with solvent to remove unreactant material and dried to remove solvent.

6. The method of claim 1, wherein said fluoroelastomer is selected from the group consisting of poly(vinylidene fluoride-hexafluoropropylene) and poly(vinylidene fluoride-hexafluoropropylene-tetrafluoroethylene).

7. The method of claim 1, wherein said shaped fluoroelastomer is supported on a substrate.

8. The method of claim 7, wherein said supporting substrate is a cylindrical sleeve.

9. The method of claim 8, wherein said cylindrical sleeve is a substrate for a fuser member.

10. The method of claim 9, wherein said member is a pressure roll, fuser roll or release agent donor roll.

11. The method of claim 1, wherein said polyorganosiloxane is covalently bonded to said fluoroelastomer and is sufficiently thin as to have substantially no affect on the physical properties of the cured fluoroelastomer.

12. The method of claim 1, wherein n is from 60 to 80.

13. The method of claim 1, wherein said thin surface layer is from about 5 to about 100 nanometers thick.

14. The method of claim 1, wherein said activating radiation is an electron beam having an energy of at least 500,000 volts and wherein said activating radiation at least about 5 Megarads.

15. The method of claim 1, wherein said polyorganosiloxane penetrates below the surface of said fluoroelastomer to a depth ranging from about 10 to about 50 microns.

* * * * *